US011176647B2

(12) United States Patent
Auner (10) Patent No.: US 11,176,647 B2
(45) Date of Patent: Nov. 16, 2021

(54) IMAGE AND OBJECT DETECTION ENHANCEMENT BASED ON LIGHTING PROFILES

(71) Applicant: Toyota Motor Engineering and Manufacturing North America, Inc., Erlanger, KY (US)

(72) Inventor: David B. Auner, South Lyon, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 46 days.

(21) Appl. No.: 16/710,636

(22) Filed: Dec. 11, 2019

(65) Prior Publication Data
US 2021/0183026 A1    Jun. 17, 2021

(51) Int. Cl.
*G06K 9/00* (2006.01)
*G06T 5/00* (2006.01)
*G06T 7/50* (2017.01)
*G06T 7/73* (2017.01)

(52) U.S. Cl.
CPC .......... *G06T 5/009* (2013.01); *G06K 9/00791* (2013.01); *G06T 7/50* (2017.01); *G06T 7/73* (2017.01); *G06T 2207/30252* (2013.01)

(58) Field of Classification Search
CPC .. G06T 5/009; G06T 7/73; G06T 7/50; G06T 2207/30252; G06K 9/00791
See application file for complete search history.

(56) References Cited

U.S. PATENT DOCUMENTS

| 5,796,094 | A | 8/1998 | Schofield et al. |
| 6,097,023 | A | 8/2000 | Schofield et al. |
| 6,741,202 | B1 | 5/2004 | Krikorian et al. |
| 6,831,261 | B2 | 12/2004 | Schofield et al. |
| 7,205,927 | B2 | 4/2007 | Krikorian et al. |
| 7,227,611 | B2 | 6/2007 | Hull et al. |
| 7,339,149 | B1 | 3/2008 | Schofield et al. |
| 7,653,215 | B2 | 1/2010 | Stam |
| 8,142,059 | B2 | 3/2012 | Higgins-Luthman et al. |
| 8,425,092 | B2 | 4/2013 | Kobayashi |
| 10,086,832 | B2 | 10/2018 | Kwon et al. |
| 2007/0221822 | A1 | 9/2007 | Stein et al. |
| 2016/0176334 | A1 | 6/2016 | Roeckl et al. |
| 2016/0182797 | A1 | 6/2016 | Kervec et al. |

(Continued)

FOREIGN PATENT DOCUMENTS

| CN | 105023254 A | 11/2015 | |
| CN | 108737700 A | * 11/2018 | |
| KR | 101108912 B1 | * 2/2012 | ............. G08G 1/161 |

*Primary Examiner* — Matthew C Bella
*Assistant Examiner* — Kathleen M Broughton
(74) *Attorney, Agent, or Firm* — Jordan IP Law, LLC (57) ABSTRACT

Methods and systems may provide for technology to identify one or more light sources. The technology generates a light reflection profile associated with the one or more light sources. The light reflection profile is to predict one or more of reflection characteristics of light emitted from the one or more light sources or identify at least one characteristic of the one or more light sources. The technology further one or more of adjusts a first image based on the light reflection profile or identify one or more characteristics of a first object in the first image based on the light reflection profile.

18 Claims, 9 Drawing Sheets

(56) References Cited

U.S. PATENT DOCUMENTS

2016/0377529 A1* 12/2016 Retterath ........... G06K 9/00818
  382/103
2017/0270375 A1* 9/2017 Grauer ................. G06K 9/6293
2018/0143304 A1 5/2018 Rosenzweig et al.
2018/0329516 A1 11/2018 Steedly et al.
2019/0061760 A1 2/2019 Pawlicki et al.

\* cited by examiner

IMAGE AND OBJECT DETECTION ENHANCEMENT BASED ON LIGHTING PROFILES

TECHNICAL FIELD

Embodiments generally relate to image enhancement and object detection. More particularly, embodiments relate to adjusting images and identifying objects based on expected reflectance profiles.

BACKGROUND

Some vehicles include imaging devices (e.g., cameras). The imaging devices may capture images from various sides of the vehicles. The imaging devices may capture images of a surrounding environment. The images may be presented to the user for review, and/or utilized to identify objects surrounding the vehicles. The images may however be unclear as lighting may be variable throughout the images. For example, a first image may include some bright areas and some dark areas (e.g., shadows). Moreover, characteristics (e.g., position, shape, size, etc.) of the objects may not be accurately detected hindering object detection and identification.

BRIEF SUMMARY

Some embodiments may include a vehicle include one or more cameras to capture one or more images including a first image, and an image controller that includes logic to identify one or more light sources, generate a light reflection profile associated with the one or more light sources, wherein the light reflection profile is to predict one or more of reflection characteristics of light emitted from the one or more light sources or identify at least one characteristic of the one or more light sources, and one or more of adjust the first image based on the light reflection profile or identify one or more characteristics of a first object in the first image based on the light reflection profile.

Some embodiments may include at least one computer readable storage medium comprising a set of instructions, which when executed by an image controller of a vehicle, cause the image controller to identify one or more light sources, generate a light reflection profile associated with the one or more light sources, wherein the light reflection profile is to predict one or more of reflection characteristics of light emitted from the one or more light sources or identify at least one characteristic of the one or more light sources, and one or more of adjust a first image based on the light reflection profile or identify one or more characteristics of a first object in the first image based on the light reflection profile.

Some embodiments may include a method of image analysis with an image controller of a vehicle, the method including identifying one or more light sources, generating a light reflection profile associated with the one or more light sources, wherein the light reflection profile is to predict one or more of reflection characteristics of light emitted from the one or more light sources or identify at least one characteristic of the one or more light sources, and one or more of adjusting a first image based on the light reflection profile or identifying one or more characteristics of a first object in the first image based on the light reflection profile.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
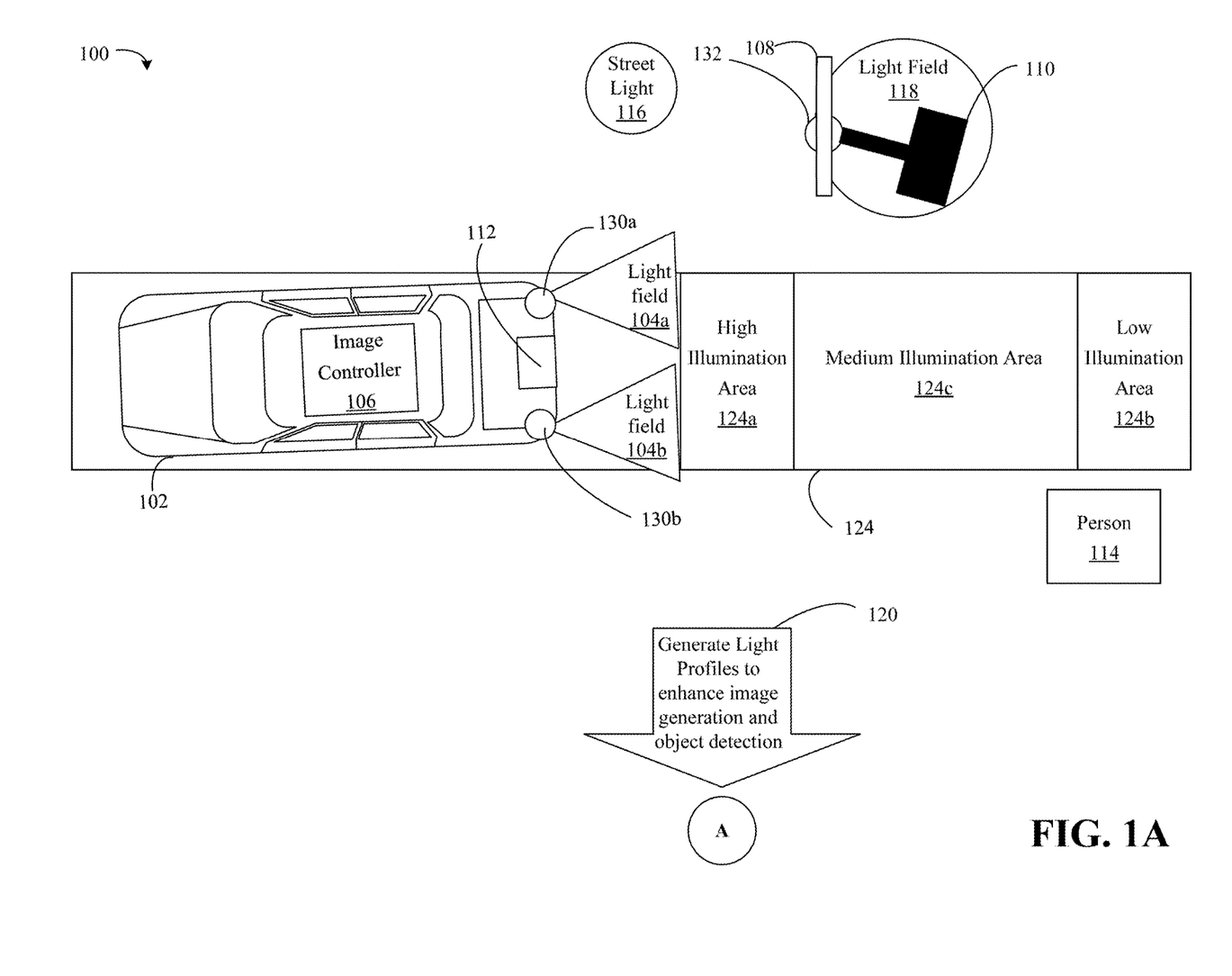
FIGS. 1A and 1B is a diagram of an example of an image enhancement and object identification scenario according to an embodiment.
Figure 1B:
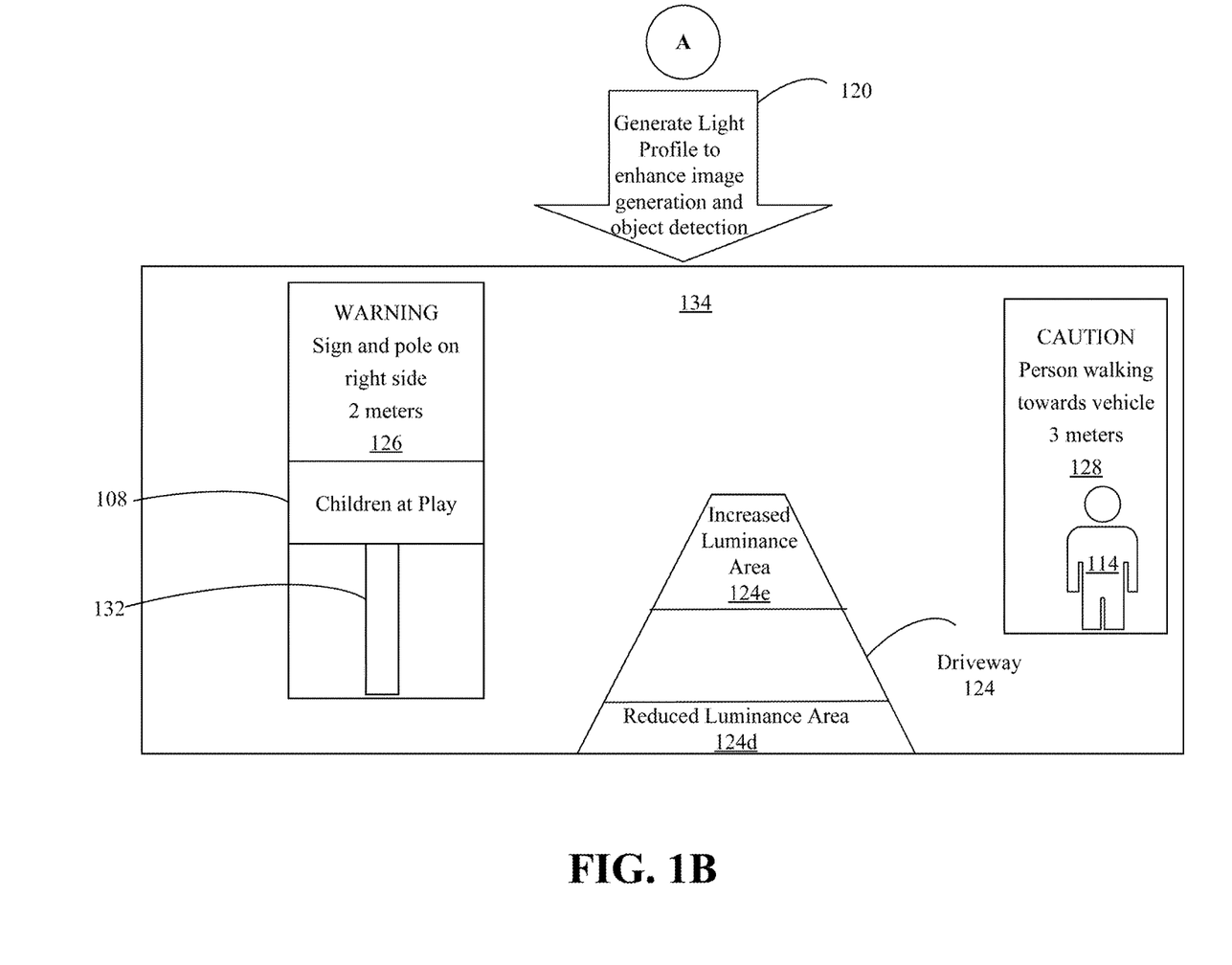

FIG. 1, illustrates a scenario 100 in which an image controller 106 enhances object detection and images based on light reflection profiles. In detail, some embodiments may mitigate the above concerns to enhance object detection and images. For example, some embodiments may include an image controller 106 in a vehicle 102 to generate light reflection profiles (e.g., 3D light inference maps, light source data, light generation data). The light reflection profiles may correspond to light sources, such as rear lighting 130a, 130b and specifically to light fields 104a, 104b emitted from the rear lighting 130a, 130b. The light reflection profiles may identify expected reflection of light from light sources, and characteristics of the light sources to aid in image enhancement (e.g., remove outlying bright and dark areas), and object detection (e.g., detect distances to the object and outline of the object). Thus, the image controller 106 may modify images and detect objects based on the light reflection profiles.

For example, during instances where a video image is of relatively poor quality during low light conditions, an imaging device 112 (e.g., a rear view camera) and/or image controller 106 may access fixed lighting (e.g., taillights, headlights, side mounted lights, tail lamp, license plate lamp, brake lamp, Lidar etc.) on the vehicle 102 to enhance the image quality during these conditions. The image controller 106 may enhance the video image based on light reflection profiles associated with the fixed lighting, and also enhance object identification based on the light reflection profiles to identify characteristics of the object (e.g., object size, height, distance, position and direction).

By adjusting the video image based on light reflection profiles, the image controller 106 may only analyze a subset of pixels of an image for luminance (e.g., light intensity level) adjustments. For example, the light reflection profiles may indicate which pixels may need adjustment, and the image controller 106 may analyze only those pixels for potential luminance adjustments. Thus, efficiency may be enhanced by only analyzing a subset of the pixels for luminance adjustments and not all pixels. In some embodiments, the amount of light emitted by a rear view monitor may adjusted for bright areas (e.g., an area that includes a bright street sign).

Furthermore, the image controller 106 may identify objects from an image based on the light reflection profiles leading to more accurate and efficient results. For example, light reflected from the objects may be indicative of characteristics of the objects, such as a distance, position, size and/or shape of the objects. As will be explained in further detail below, the image controller 106 may identify the characteristics of the object based on the light reflection profile (e.g., a position, type and/or strength of the light sources) and detected light (e.g., light originating from a the light sources) reflected by the objects. Thus, some embodiments detect objects with enhanced accuracy. Doing so may enhance safety, for example through avoidance of objects during automated driving, warning a user during manual driving situations and/or adjusting driving conditions of the vehicle 102 (e.g., automatically providing torque to all wheels prior to reaching a low traction area such as snow) based on the detected objects.

In detail, the vehicle 102 may be reversing. The vehicle 102 may include two rear lights 130*a*, 130*b* that emit light fields 104*a*, 104*b*. The vehicle 102 may also include an imaging device 112 to capture images as the vehicle reverses. The image controller 106 (which may include a non-transitory computer readable storage medium containing instructions, configurable logic and/or fixed-function logic hardware to execute the operations herein), may analyze the captured images to detect objects and present modified versions of the images to a user via a display of the vehicle 102.

For example, the image controller 106 may ascertain locations of rear lights 130*a*, 130*b*, and the street light 116. The image controller 106 may enhance a rear camera image by determining positions of the rear lighting 130*a*, 130*b* at the time of image capture. The image controller 106 may be programmed ahead of time with relative positions of the rear lighting 130*a*, 130*b*. For example, in some embodiments, the positions of the rear lighting 130*a*, 130*b* are relative positions identified in relation to an object, the imaging device 112 and/or an outer perimeter of the vehicle 102. The position of the street light 116 may also be identified through various techniques, such as lidar, image recognition, proximity sensors, gps mapping function, etc.

The image controller 106 may further identify characteristics of the rear lights 130*a*, 130*b*. For example, the rear lights 130*a*, 130*b* may have known illumination characteristics such as intensity, direction, position and color. Such characteristics may be utilized to generate a light reflection profile. For example, in a completely unlit environment, illumination from the rear lights 130*a*, 130*b* may provide the most, if not all, illumination captured by the imaging device 112. Thus, the radiation of such light may be mapped to determine an interaction (e.g., reflection characteristics) of the light with surrounding surfaces under certain lighting conditions. Such interactions may aid in image enhancements under identified lighting conditions. The light reflection profile may include such characteristics of the rear lighting 130*a*, 130*b*, including the interaction of light from the rear lighting 130*a*, 130*b* with surrounding objects.

For example, reflection characteristics (which may be stored in light reflection profiles) associated with the rear lighting 130*a*, 130*b* may be predicted and mapped via an inference engine of the image controller 106, in 3D space based on a given material, size and orientation of a surface. That is, the image controller 106 may identify a characteristic of an object (e.g., material, size and orientation of a surface), and predict reflection characteristics of light fields 104*a*, 104*b* with the object based on the characteristics. In some embodiments, the reflection characteristics are further determined based on characteristics (e.g., strength, color, intensity, etc.) of the light fields 104*a*, 104*b*.

In a more detailed example, suppose that the image controller 106 captures an image of the driveway 124. The image controller 106 may employ image recognition techniques to determine that the image includes the driveway 124, and a material (e.g., concrete) of the driveway 124. The image controller 106 may further identify an approximate shape of the driveway 124 and that the image corresponds to generally an unlit external environment except for street light 116 and the rear lighting 130*a*, 130*b*. The image controller 106 may generate a light reflection profile based on the reflection characteristics and/or the characteristics of the rear lighting 130*a*, 130*b*. The light reflection profile may be a 3D map that predicts and/or estimates how light fields 104*a*, 104*b* from the rear lighting 130*a*, 130*b* will interact with the driveway 124 (and other objects) in an unlit environment and based on the above identified characteristics (e.g., material, size and orientation) of the driveway 124.

In the scenario 100, the image controller 106 may reduce expected bright spots and enhance expected dark areas in the image. That is, the light reflection profile may indicate that the driveway 124 behind the vehicle 102 may include a high illumination area 124*a*, a medium illumination area 124*c* and a low illumination area 124*b*. The image pixels may be enhanced so that the driveway 124 appears to have a uniform luminance by modifying luminance of the high illumination area 124*a*, medium illumination area 124*c* and low illumination area 124*b*. For example, the image controller 106 may adjust the image to decrease the luminance in the predicted high illumination area 124*a* and increase luminance in the predicted low illumination area 124*b*. The image controller 106 may not adjust luminance in the medium illumination area 124*c* as the medium illumination area 124*c* may be comfortably viewed by the user without adjustment.

Thus, the image controller 106 need not check every pixel in the image for luminance adjustments. For example, some other systems may need to inefficiently iterate through every respective pixel of an image to check whether the respective pixel has a luminance that is outside of acceptable boundaries, and adjust the luminance if so. Rather, the image controller 106 may efficiently identify the pixels of the image corresponding to the high illumination area 124*a* and low illumination area 124*b* and adjust luminance values of those pixels. Of note is that the image controller 106 need not analyze the luminance values of pixels corresponding to the medium illumination area 124*c*. Rather, the image controller 106 may assume that such luminance values are within acceptable boundaries based on the light reflection profiles. As such, the image controller 106 may execute with enhanced efficiency, reduced power, reduced resources and less latency than other systems.

Similar light reflection profiles (e.g., external light reflection profiles) may be generated for sides and a front of vehicle 102, and the illumination of the image may be adjusted prior to being displayed. For example, light reflection profiles may be generated for external light sources, such as the street light 116, and used to improve the displayed image. The image controller 106 may identify typical output characteristics for external light sources and a position of the external light sources may be estimated from the image.

For example, the image controller 106 may generate a light reflection profile (e.g., an external light reflection profile) that predicts reflection characteristics of light field 118 of street light 116, and similarly to as described above. The street light 116 is external to the vehicle 102 (not a part of the vehicle 102). The image controller 106 may estimate a position and type of the street light 116 to estimate a light output and direction of light from the street light 116. For example, different types of street lamps may emit light at different frequencies. Thus, the image controller 116 may determine a frequency of light from the street light 116 and use the frequency to identify a type of the street lamp 116, a probable height of the street lamp 116 and further determine a location of the street lamp 116. Based on the estimation, the image controller 106 may identify that the light field 118 will interact with the sign 108 and pole 132 connected to the sign 108, thus creating a shadow 110. As such, the reflection characteristics of an external light reflection profile associated with the street light 116 may indicate that a shadow 110 is present in the image. The image controller 106 may adjust the image to remove the shadow 110 from the image by increasing luminance in the area of the shadow in the image, and/or replacing the area of the shadow to match areas around the shadow via an image extrapolation and copying process.

In some embodiments, the external light profile may identify specular and diffuse reflection characteristics between the relative movement of an object, light source and camera. These characteristics may be used to identify an object and adjust a camera image. For example, an object, such as the post 132 with the reflective sign 108, may provide a specular reflection at a specific reflection angle to the relative movement of a light source, such as the rear lighting 130a, 130b, other objects and a camera. The diffuse reflections from the object may provide additional identifying information. As another example, a moving light source from a second vehicle may be used to create additional 3D mapping information and be used to adjust the image. The image controller 106 may identify a movement vector of the second vehicle through different techniques, including image recognition, lidar, etc. The image controller 106 may predict a shift in light sources of the second vehicle based on the movement vector to adjust the external illumination profile of the second vehicle in an efficient manner.

In some embodiments, the difference between the camera output and the calculated 3D light reflection profiles may be used to judge effect (if any) of other, light sources that are undetected by sensors of the vehicle 102. As another example, the image controller 106 may detect not-visible objects. A lidar/light reflection from an object that is greater than expected may be used to infer that there is another emitter on an unseen object, such as an unseen vehicle, in the vicinity. Changes over time from the expected light profile may be used to judge movement potential of the unseen object. Sudden changes in the reflectance profile may be used indicate other objects such as an unseen pedestrian crossing in front of the unseen emitter. For example, some embodiments may identify one or more changes in characteristics of the light reflection profile, determine a distance and a movement of the external light source (an undetected light source) based on the changes, and determine if another object has moved between the external light source and a reflectance area associated with a captured image.

As another example, the image controller 106 may execute image enhancements for visible objects. For example, the image controller 106 may determine that the shadow 110 will be generated based on the light reflection profiles associated with the street light 116. If however the shadow 110 was not present in the image or had higher than expected luminance levels in one or more portions of the shadow 110, the image controller 106 may infer that another external light source (that was previously undetected and absent from the image) is present within the area and projecting light into the area where shadow 110 was predicted to be within. The image controller 106 may estimate characteristics (e.g., position, light output, direction, etc.) of the other external light source based on the difference between the light reflection profile and the image. For example, the approximate position of the other external light source may be most proximate to the highest luminance portions of the area, and a distance to the external light source may be estimated based on predefined light values (e.g., average light emission luminosities, etc.) and a luminance measurements of the highest luminance portions. The image controller 106 may generate a light reflection profile for the other light sources and adjust the image based on the light reflection profile to adjust high luminance and low luminance areas generated by the other light sources.

In some embodiments, similar light reflection profiles may be generated based on a position of predictably moving light sources, such as astral bodies like the sun, moon and stars. For example, the image controller 106 may identity information, including a current time that the image is taken, a date that the image is taken and global positioning coordinates of the vehicle 102 to determine an expected characteristics of astral bodies, such as a sun position and light reflection characteristics of the sun. For example, the image controller 106 may access an online web page or database via the internet to determine lighting characteristics of the astral bodies, such as a position of the sun, moon and/or stars relative to the vehicle 102 and the imaging device 112, an expected luminance of the sun, moon and or stars in the area around the vehicle 102, and so on. For example, an astral body reflection profile may include a sun reflection profile that may be generated based on the identified lighting characteristics that corresponds to an interaction that light from the sun will have with the area surrounding the vehicle 102. The sun reflection profile may predict reflection characteristics of light from the sun in the area surrounding the vehicle 102.

The image controller 106 may also access weather data via the internet to determine whether a cloud cover or weather condition exists which would occlude or reduce the light of the sun that will reach the area imaged by the imaging device 112. The image controller 106 may generate an astral body and/or weather light reflection profile and adjust the image prior to display.

Input from weather reporting and camera image analysis of cloud cover may further be used to adjust the displayed image. For example, if the image controller 106 identifies a poor lighting condition from the image (e.g., a cloud cover, rain, etc.), the image controller 106 may determine that the sun is occluded and adjust the image accordingly.

Some embodiments may also include identifying an object in the image based on any of the light reflection profiles described herein. For example, some embodiments may determine a light reflection profile of a light source, determine a difference between the light reflection profile and the image, and identify an object based on the difference. That is, the difference may correspond to a particular object (e.g., pole, mailbox, etc.). For example, a shiny reflection segment in the image may correspond to a metal mailbox.

In more detail, known luminance, such as the light fields 104a, 104b, 118 from the rear lighting 130a, 130b and the street light 116 may be used to enhance object detection. Known light source reflection characteristics of an object, such as the sign 108 and the pole 132, may be used to classify the object. The difference between the camera output and the calculated light reflection profile may be used to judge effect (if any) of other objects. For example, suppose that from the image of the imaging device 112, the image controller 106 determines that the shadow 110 from the sign 108 and the pole 132 begins farther away from the pole 132 than predicted by the light reflection profile of the street light 116. The image controller 106 may determine that the length of the pole 132 is actually larger than originally predicted by the image controller 106 and record the length as the correct value. Further, the shadow 110 may improve a location estimate of the light placement. In another example, the length and width and shadow 110 may be used to determine approximate dimensions of the sign 108 and the pole 132. In some embodiments, the angle between the shadow 110 and the pole 132 may correspond to the height and distance of the pole 132 and the sign 108. That is, identification of the sign 108 and the pole 132 may be enhanced based on known values of lights, such as street lights 116 and the rear lighting 130a, 130b, to identify and modify characteristics of the sign 108 (e.g., object size, height, distance, position and relative direction) and the ground plane around the sign.

For example, the positions of the light fields 104a, 104b relative to the imaging device 112 will illuminate the sign 108 and the pole 132 in a specific manner. The pole 132 and the sign 108 have different reflection characteristic from each other. For example, the sign 108 has a rectilinear shape while the pole 132 has a cylindrical shape. Light reflected from the sign 108 to the imaging device 112 will therefore have different characteristics than light reflected from the pole 132 to the imaging device 112. Thus, an approximate shape of the pole 132 and/or the sign 108 may be identified. The image controller 106 may analyze the light reflected from the pole 132 and the sign 108 to identify proximate shapes. Astral objects may also have a different position and reflection characteristics and may be used to supplement the information for the image controller.

The image controller 106 may further determine that the street light 116 will project the light field 118 onto the sign 108 and the pole 132. The image controller 106 may adjust the object analysis to reduce or eliminate interferences of the light field 118 with the light fields 104a, 104b. For example, the image controller 106 may isolate the light fields 104a, 104b in the image by removing a predicted effect of the light field 118 by eliminating predicted luminance of the street light 116 from the image. For example, the image controller 106 may access a light profile of the street light 116 to ascertain the effect of the street light 116, and eliminate the effect. Thus, in any of the embodiments described herein the image controller 106 may isolate the effect the light fields 104a, 104b have on the sign 108 and pole 132 by removing the light field 118.

The image controller 106 may identify a position of the pole 132 and the sign 108 relative to the vehicle 102. For example, if the pole 132 is on a centerline of the vehicle 102, then the light illumination from the light fields 104a, 104b on two opposite sides of the pole 132 will be relatively equal. If however the image controller 106 identifies that the reflection of light on one side of the pole 132 is greater than the other side of the pole 132, then the image controller 106 may determine that the pole 132 is not along the centerline of the vehicle 102. Rather, the image controller 106 may analyze the difference between the luminance of the sides of the pole 132 to determine a side of the vehicle 102 that the pole 132 is disposed on. Additional object position judgement may be obtained by ascertaining the position of the rear lighting 130a, 130b, light source reflection characteristics and a position of light on the object.

For example, a light reflection profile of the rear lighting 130a, 130b may be generated to identify projection directions for the light fields 104a, 104b, a luminance of the light fields 104a, 104b as emitted, color of the light fields 104a, 104b, etc. Such a light reflection profile may be used to aid object classification and position judgment.

For example, the image controller 106 may identify from the image captured by the imaging device 112, an amount of light reflected from the sign 118 and the pole 132. The image controller 106 may compare the image to the light reflection profiles to determine an approximate position and/or distance of the sign 108 and pole 132 relative to the vehicle 102 as well as a shape and size of the sign 108 and pole 132. For example, the light fields 104a, 104b may decrease in strength over distance. That is, intensity or brightness of light as a function of the distance from the light source may follow an inverse square relationship. Thus, the distance between the lighting 130a, 130b and the sign 108 may be determined based on the known luminance of the light fields 104a, 104b compared to luminance of light on the sign 108 and/or the pole 132 in the image. Thus, the image controller 106 may determine the distance between the vehicle 102 and the sign 108 and/or the pole 132.

In some embodiments, detection of an object moving relative to the vehicle may also be enhanced by the comparison with the 3D mapping changes for known light reflections. For example, the image controller 106 may identify a person 114 in the image. The image controller 106 may compare lighting changes between various images to determine whether the person 114 is approaching the vehicle 102 or moving away from the vehicle 102. For example, the light field 104b may be reflected by the person 114 and captured by the image controller 106 in a series of images. The image controller 106 may compare images to determine whether the light field 104b reflected by the person 114 is increasing in luminance or decreasing in luminance. If the reflected light is increasing over the series of images, the person 114 is approaching the vehicle 102. If the reflected light is decreasing, the person 114 may be walking away from the vehicle. To further refine the exact position of the person 114, the image controller 106 may access the light reflection profile of the rear lighting 130b to determine a position of the rear lighting 130b relative to the vehicle 102 and a strength of the light field 104b, and that the rear lighting 130b is on the vehicle 102. The image controller 106 may calculate a reduction in luminance reflected by the person 114 (as indicated in the image). The distance between the vehicle 102 and the person 114 may then be determined by calculating an approximate distance needed to decrease the light field 104b by the calculated reduction in luminance.

Similar light reflection profiles may be generated for front, side and rear of vehicle illumination and be used to enhance object detection. Similar to above, light reflection profiles may be generated for external light sources and be used to improve the object recognition. For example the calculated position of the street light 116 and estimated light output associated with the light field 118 may be used to create a 3D inference map for object reflection that is stored in a light reflection profile. The image controller 106 may access the 3D inference map to aid in object recognition. As another example, an external light source may include a moving light source, such as another vehicle's lamps, may provide additional 3D mapping information and aid object recognition.

Similar to above, astral body (e.g., sun) reflection profiles may be created and used to aid object recognition. Additional input from weather reporting and camera image analysis of cloud cover can be used to adjust for object detection.

As illustrated in FIG. 1A, the image controller 106 may generate light profiles to enhance image generation and object detection 120. FIG. 1B illustrates an output 134 (e.g., a modified image or data structure) generated by the image controller 106 and that that may be presented to a driver of the vehicle 102, that the vehicle 102 may reference to determine autonomous driving behavior and/or that the vehicle 102 may reference to determine driving parameters. To adjust luminance levels, the image controller 106 may modify an original image captured by the imaging device 112 to generate the output 134. For example, the image controller 106 may modify images so that a monitor image color temperatures may be adjusted towards natural sunlight instead of the actual yellowish hues from a street lamp. The image controller 106 may reduce shadows and provide added shading of objects in the monitor output.

As illustrated, the image controller 106 has generated output 134 to include a warning 126 instructing the driver that the sign 108 and the pole 132 are on the right side of the vehicle 102 at distance of 2 meters. The image controller 106 has further removed the shadow 110 from the output 134. The image controller 106 further has adjusted the driveway 124 to generate a reduced luminance area 124*d* corresponding to the high illumination area 124*a* and an increased luminance area 124*e* corresponding to the low illumination area 124*b*. For example, monitor luminance may be increased in the increased luminance area 124*e* and luminance may be reduced in the reduced luminance area 124*d* to compensate for the low and high luminance levels in high and low illumination areas 124*a*, 124*b* in the original image.

Moreover, the image controller 106 has generated a warning 128 for the person 114. As illustrated, the warning 128 identifies that the person 114 is walking towards the vehicle 102, and a distance of the person 114 from the vehicle 102.

Thus, the image controller 106 may enhance object detection based on light reflection profile to enhance warnings to a user, as well as to autonomously control other aspects of vehicle 102. The image controller 106 may moreover adjust the original image based on light reflection profiles to generate an enhanced output 134 that is easily discernible to a driver. Further, the image controller 106 may have enhanced efficiency, less resource usage and lower latency than other systems.

Figure 2:
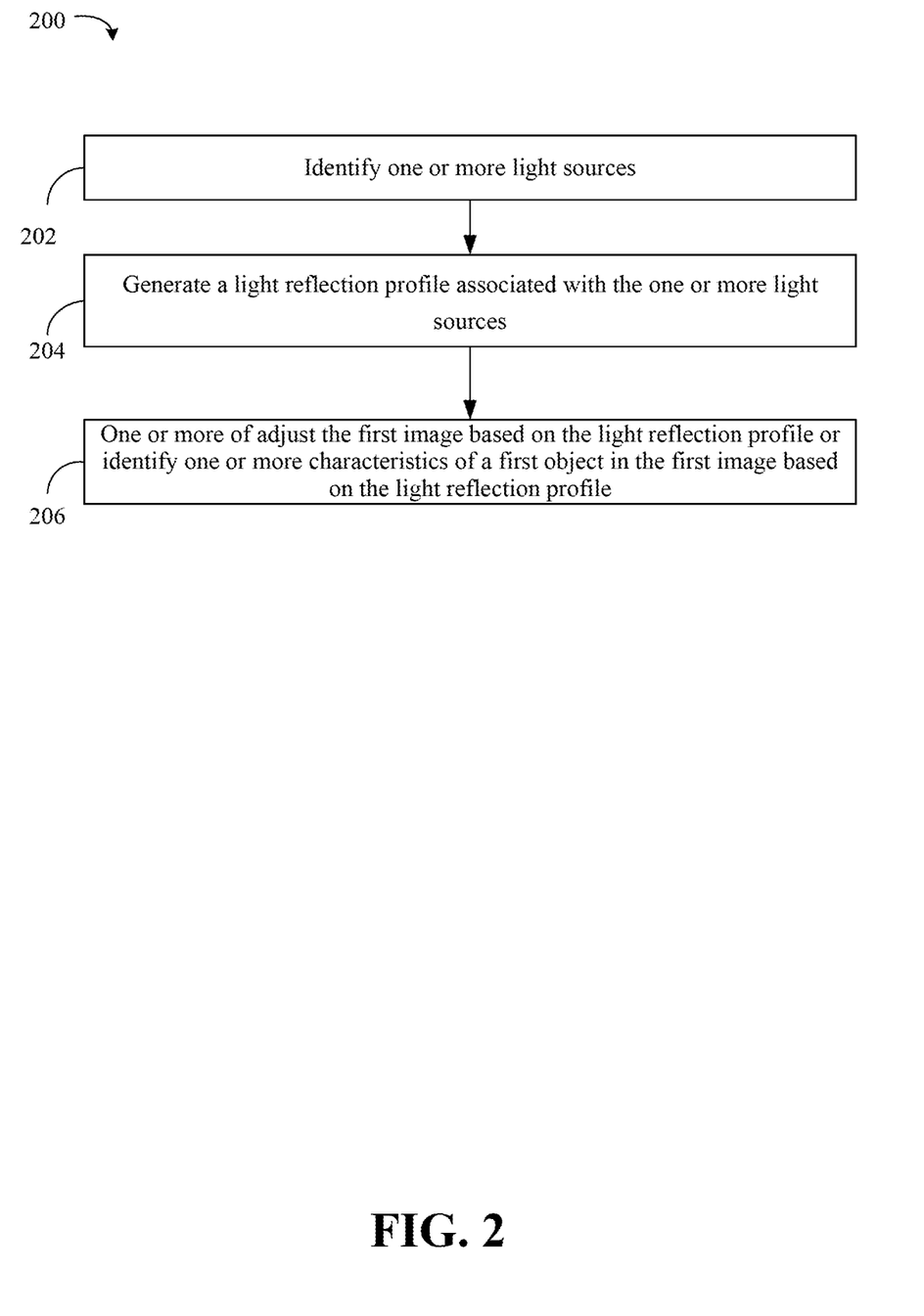
FIG. 2 is a flowchart of an example of a method of adjusting images and/or enhanced object detection according to an embodiment.

FIG. 2 shows a method adjusting images and/or enhanced object detection. The method 200 may generally be implemented in a vehicle's imaging system such as, for example, the image controller 106 (FIG. 1). In an embodiment, the method 200 is implemented in logic instructions (e.g., software), configurable logic, fixed-functionality hardware logic, etc., or any combination thereof.

Illustrated processing block 202 identifies one or more light sources. Illustrated processing block 204 generates a light reflection profile associated with the one or more light sources. In some embodiments, illustrated processing block 204 generates the light reflection profile based on an identified position of a first light source of the one or more light sources. The light reflection profile predicts one or more of reflection characteristics of light emitted from the one or more light sources or identifies at least one characteristic of the one or more light sources. Illustrated processing block 206 one or more of adjusts the first image based on the light reflection profile or identifies one or more characteristics of a first object in the first image based on the light reflection profile. In some embodiments, the method 200 may further include determining reflected light from the first object based on the first image, and identifying the one or more characteristics of the first object based on the determined reflected light and the light reflection profile. The one or more characteristics include a size of the first object, a height of the first object, a distance of the first object from the vehicle, a position of the first object relative to the vehicle and a direction of the first object relative to the vehicle.

Figure 3:
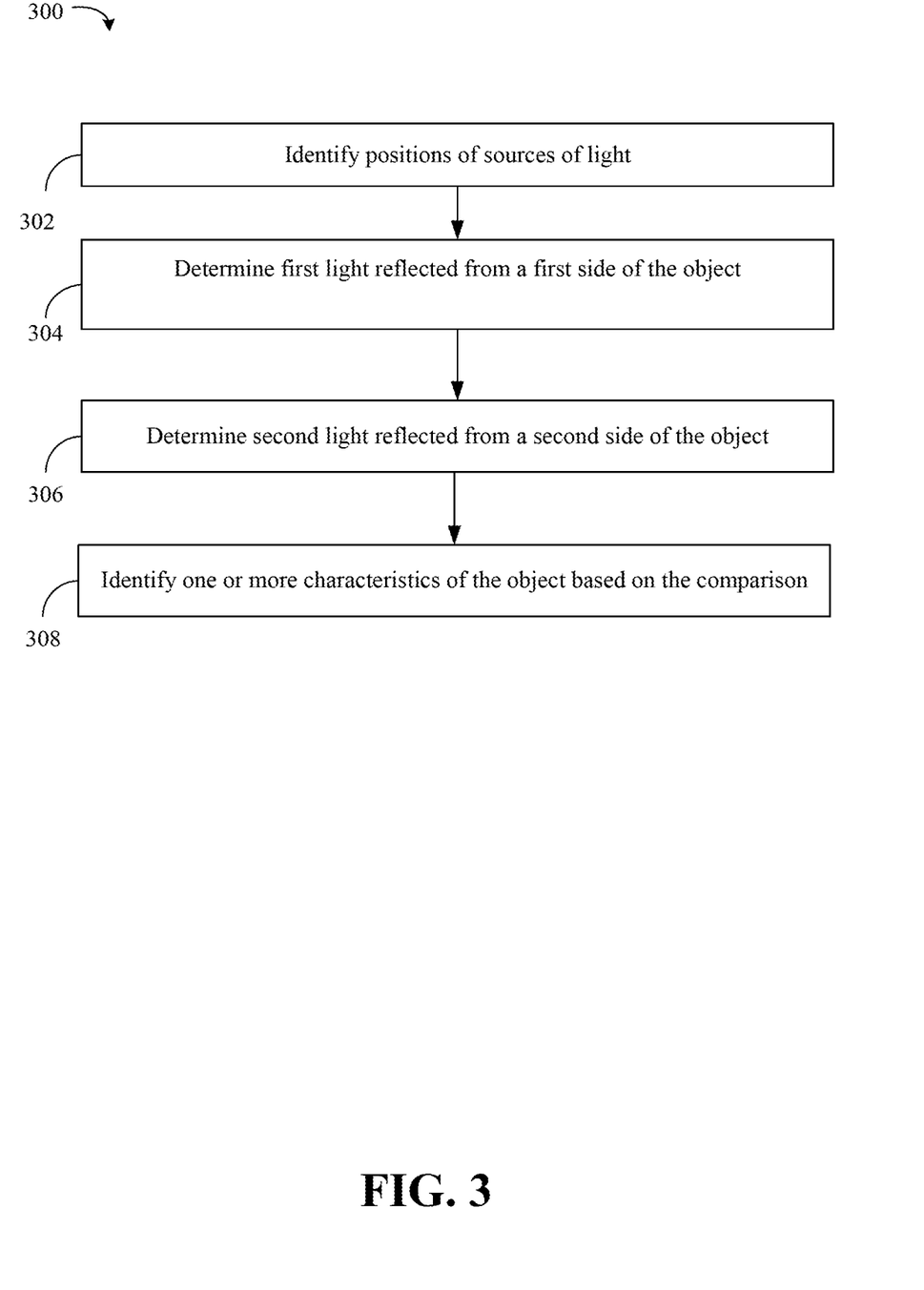
FIG. 3 is a flowchart of an example of a method of identifying an object based on light reflection profiles according to an embodiment.

FIG. 3 shows a method 300 of identifying an object based on light reflection profiles. The method 300 may generally be implemented in a vehicle's imaging system such as, for example, the image controller 106 (FIG. 1). In an embodiment, the method 300 is implemented in logic instructions (e.g., software), configurable logic, fixed-functionality hardware logic, etc., or any combination thereof.

Illustrated processing block 302 identifies positions of sources of light from an image. The positions may be defined in relation to the vehicle and/or an image device of the vehicle. Illustrated processing block 304 determines first light reflected from a first side (e.g., left side) of an object. Illustrated processing block 306 determines second light reflected from a second side (e.g., right side) of the object. Illustrated processing block 308 identifies one or more characteristics of the object based on the comparison. For example, if the intensity of the first light reflection is greater than the intensity of the second light reflection, processing block 308 may identify that the object is on a corresponding first side (e.g., right) of the vehicle.

Figure 4:
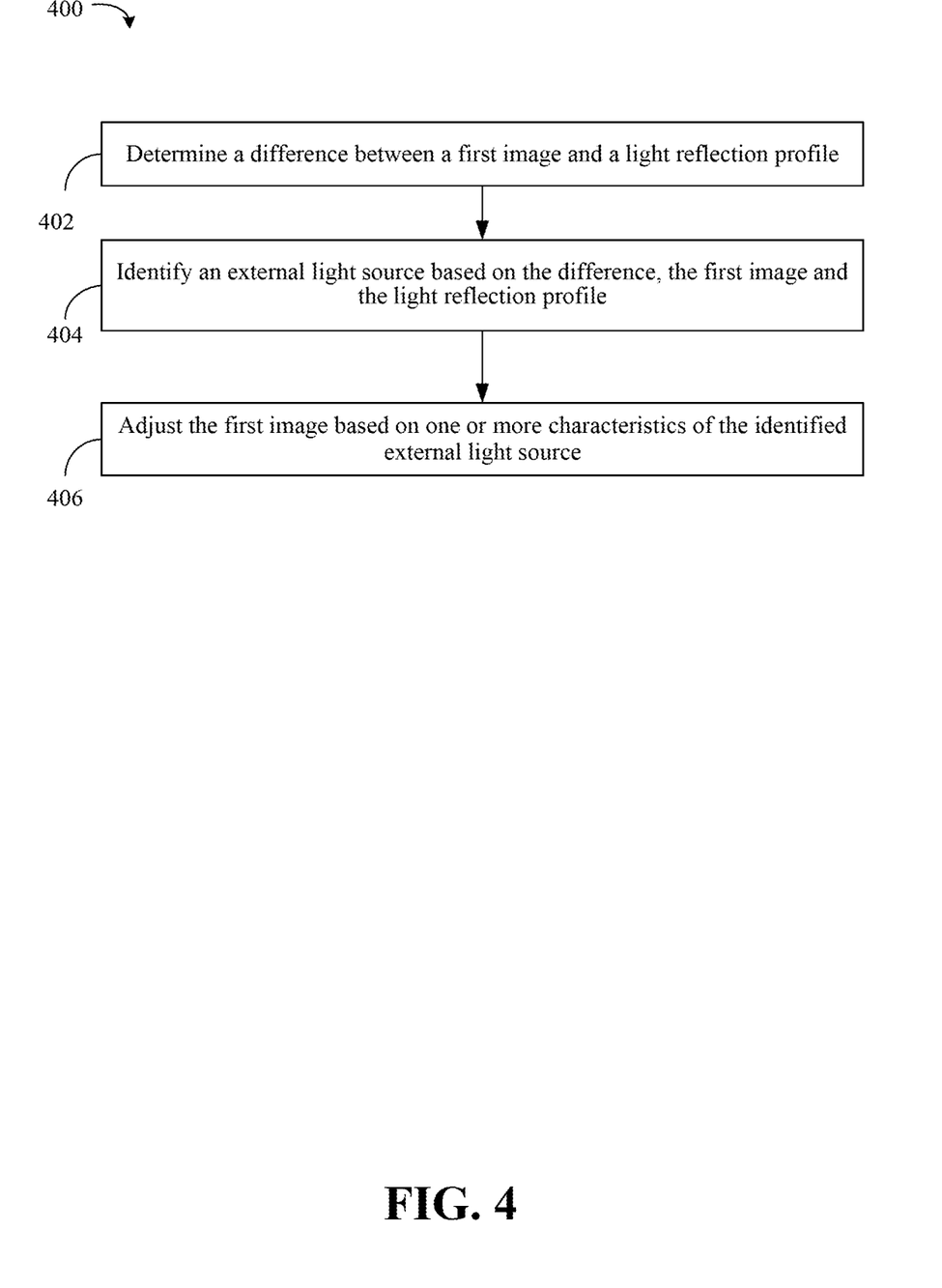
FIG. 4 is a flowchart of an example of a method of adjusting an image based on external light source according to an embodiment.

FIG. 4 shows a method 400 of adjusting an image based on external light source. The method 400 may generally be implemented in a vehicle's imaging system such as, for example, the image controller 106 (FIG. 1). In an embodiment, the method 400 is implemented in logic instructions (e.g., software), configurable logic, fixed-functionality hardware logic, etc., or any combination thereof.

Illustrated processing block 402 determines a difference between a first image and a light reflection profile. For example, the difference may include higher and/or lower luminance areas present in the first image, and that are not identified by the light reflection profile. Illustrated processing block 404 identifies an external light source based on the difference, the first image and the light reflection profile. For example, the higher luminance areas (i.e., the identified difference) may indicate that a light source is present. The position of the higher luminance areas also indicate where the external light source is positioned, and a direction of radiation of the external light source. For example, processing block 404 may map a vector in a direction of increasing luminance in the high luminance area. The direction of the radiation may be along the vector. Illustrated processing block 406 adjusts the first image based on one or more characteristics (e.g., direction of radiance of light, position, etc.) of the identified external light source. For example, illustrated processing block 406 may generate an external light reflection profile for the identified external light source and the one or more characteristics of the external light source. The first image may be adjusted based on the external light reflection profile to compensate for luminance from the external light source.

Figure 5:
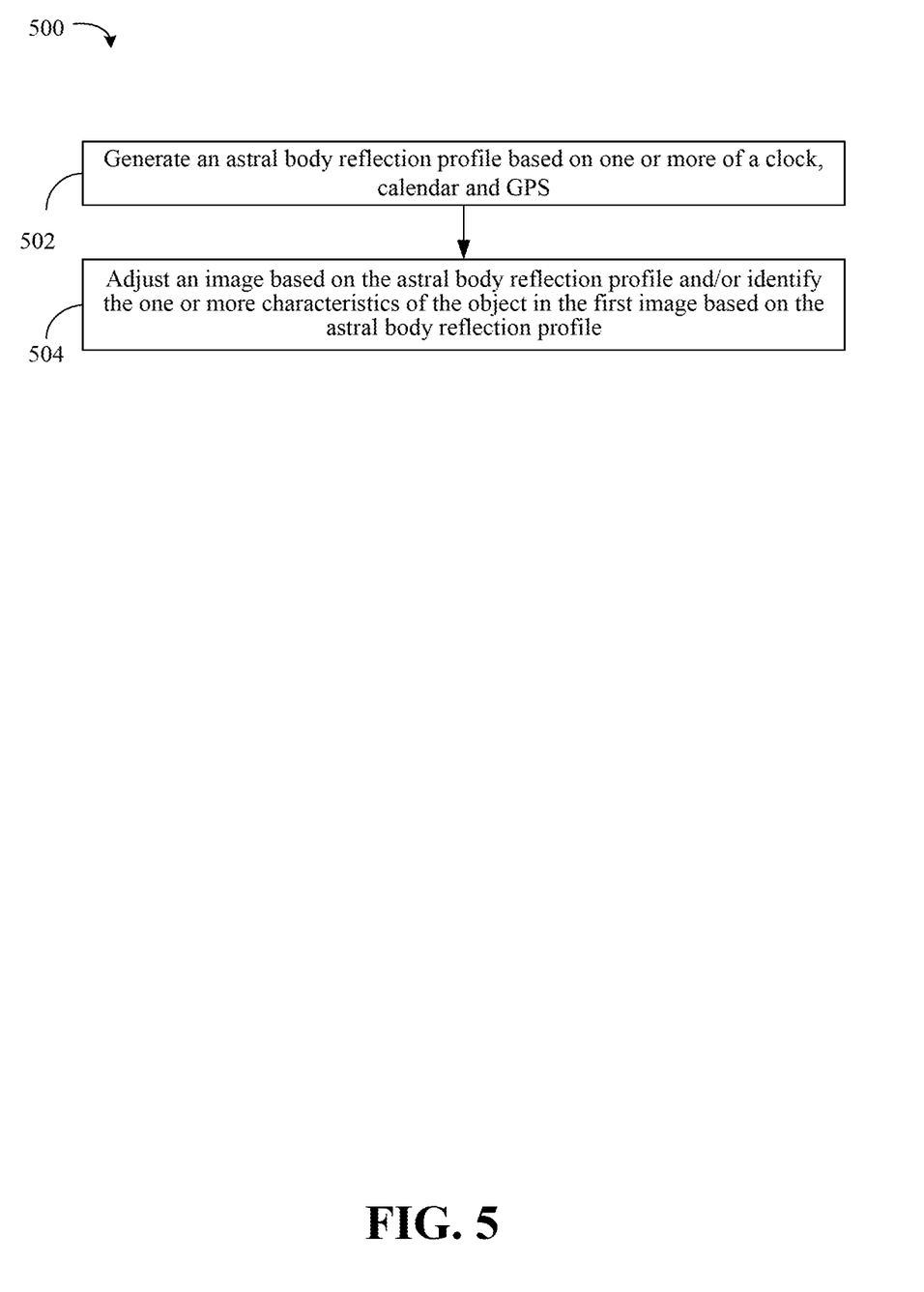
FIG. 5 is a flowchart of an example of a method of generating an Astral body reflection profile according to an embodiment.

FIG. 5 shows a method 500 of generating an astral body (e.g. sun, moon, planets, stars) reflection profile that may be accessed for image enhancement and object identification. The method 500 may generally be implemented in a vehicle's imaging system such as, for example, the image controller 106 (FIG. 1). In an embodiment, the method 500 is implemented in logic instructions (e.g., software), configurable logic, fixed-functionality hardware logic, etc., or any combination thereof.

Illustrated processing block 502 generates an astral body reflection profile based on one or more of a clock, calendar and GPS. Illustrated processing block 502 retrieves data from an online database or website based on the one or more of a clock, calendar and GPS to generate the astral body reflection profile. In some embodiments, image processing may further be combined with processing block 502 to identify characteristics of the astral body (e.g., position and/or whether occluded). Illustrated processing block 504 adjusts an image based on the astral body reflection profile and/or identifies one or more characteristics of an object in the image based on the astral body reflection profile.

Figure 6:
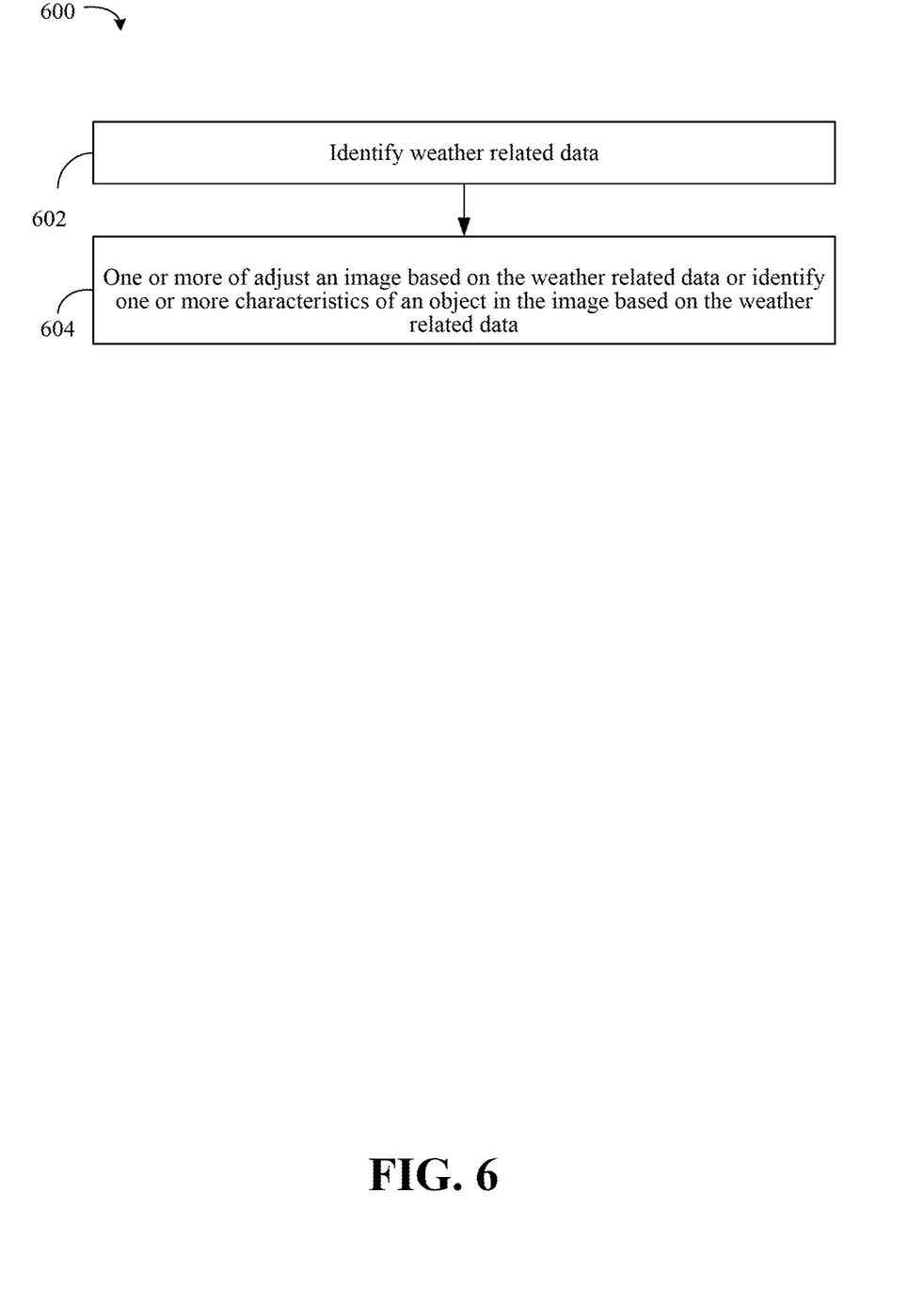
FIG. 6 is a flowchart of an example of a method of a identifying weather related data according to an embodiment.

FIG. 6 shows a method 600 of identifying weather related data that may be accessed for image enhancement and object identification. The method 600 may generally be implemented in a vehicle's imaging system such as, for example, the image controller 106 (FIG. 1). In an embodiment, the method 600 is implemented in logic instructions (e.g., software), configurable logic, fixed-functionality hardware logic, etc., or any combination thereof.

Illustrated processing block 602 identifies weather related data based on one or more of a clock, calendar and GPS. Illustrated processing block may retrieve data from an online database or website based on the one or more of a clock, calendar and GPS to generate the weather related data. In some embodiments, image processing may further be combined with processing block 602 to identify characteristics of the weather (e.g., raining, dark, night time, foggy, etc.). Illustrated processing block 604 one or more of adjusts an image based on the weather related data or identifies one or more characteristics of an object in the image based on the weather related data.

Figure 7:
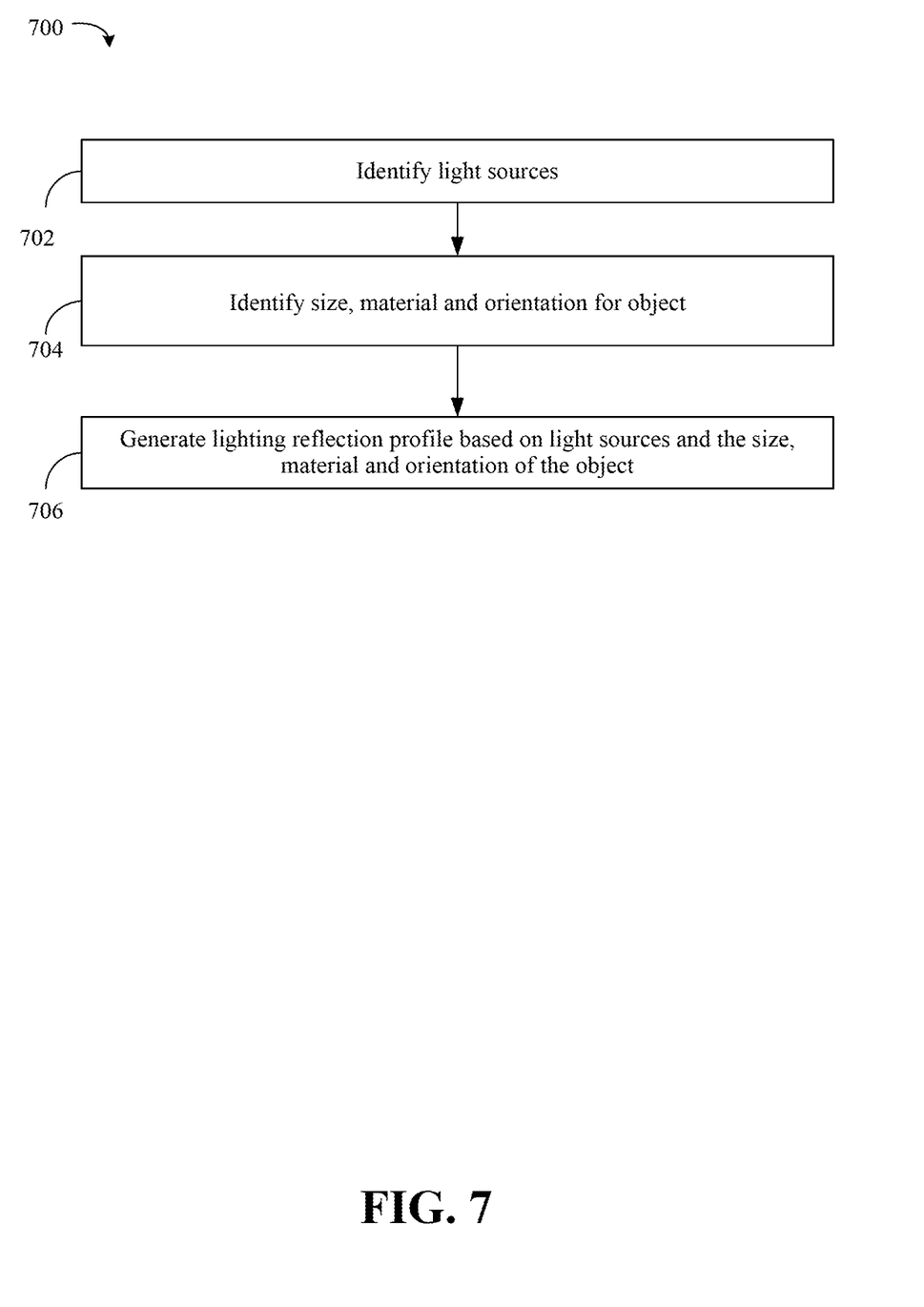
FIG. 7 is a flowchart of an example of a method of generating a light reflection profile based on objects and characteristics of lighting according to an embodiment.

FIG. 7 shows a method 700 of generating a light reflection profile based on objects and characteristics of lighting. The method 700 may generally be implemented in a vehicle's imaging system such as, for example, the image controller 106 (FIG. 1). In an embodiment, the method 700 is implemented in logic instructions (e.g., software), configurable logic, fixed-functionality hardware logic, etc., or any combination thereof.

Illustrated processing block 702 identifies light sources. For example, illustrated processing block 702 identifies a frequency, size, position, direction of radiance, strength, color and so forth of the light sources. Illustrated processing block identifies a size of an object, a material of the object and an orientation of the object. Illustrated processing block 706 generates a light reflection profile based on light sources and the size, material and orientation of the object. The light reflection profile describes how the light from the light sources will interact with the object, and particularly the effect the interaction has on image capture.

Figure 8:
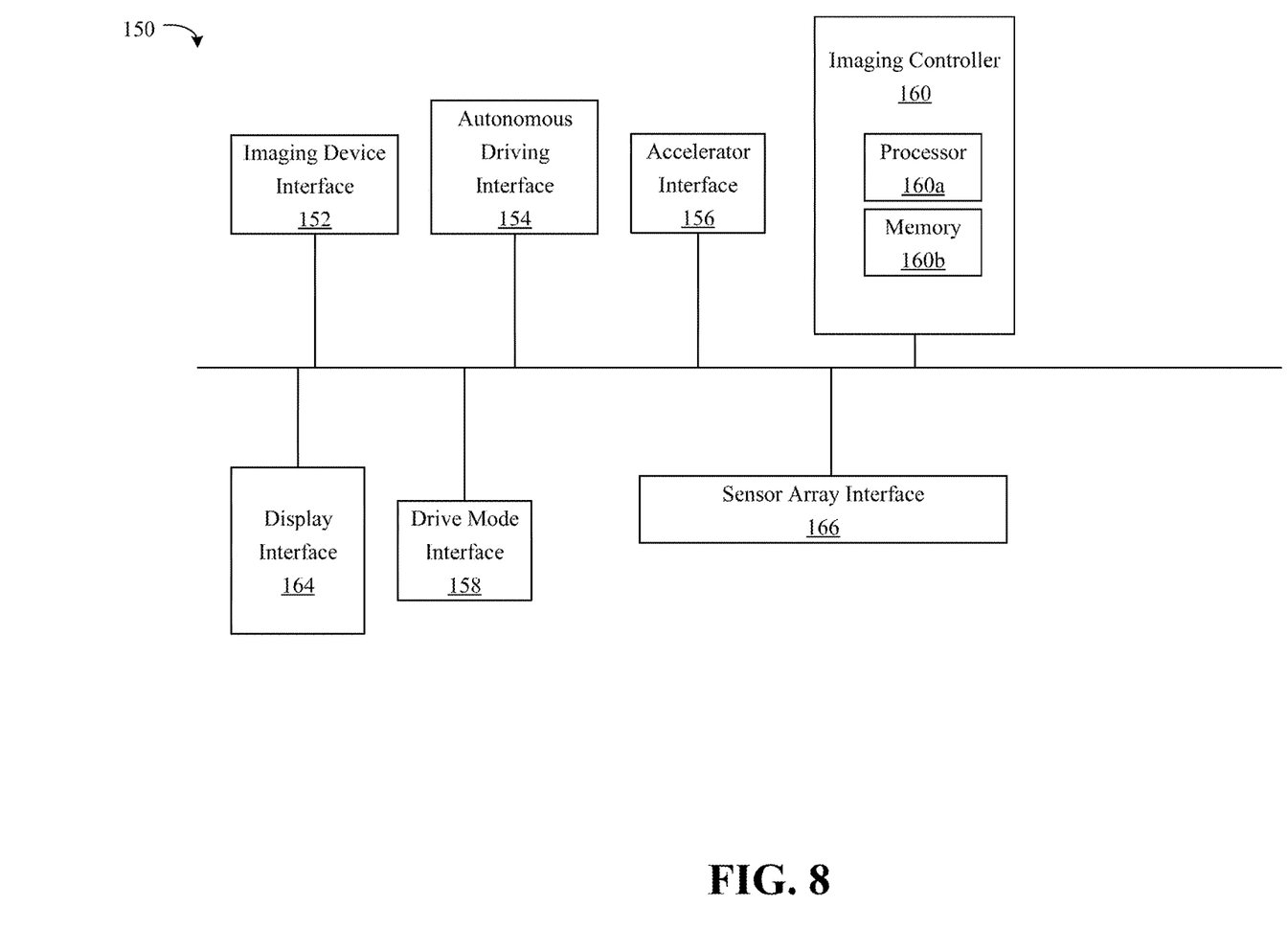
FIG. 8 is a block diagram of an example of an imaging control system according to an embodiment.

FIG. 8 shows a more detailed example of an imaging control system 150 to enhance images and object identification. The illustrated control system 150 may be readily substituted for the image controller 106 (FIG. 1), already discussed, and may execute any of the methods 200 (FIG. 2), 300 (FIG. 3), 400 (FIG. 4), 500 (FIG. 5), 600 (FIG. 6) and 700 (FIG. 7) in combination or separately.

In the illustrated example, the control system 150 may include an imaging device interface 152. The imaging device interface 152 may receive images from an imaging device. The control system 150 may further include an autonomous driving interface 154 to control autonomous driving of a vehicle based on the enhanced object identification and image enhancements described herein. The control system 150 further includes a display interface 164 to provide enhanced images to a display. The control system 150 further includes a drive mode interface 158 to adjust a driving condition (e.g., traction modes, headlight strength, etc.) based on enhanced images and object detection as executed by the image controller 160.

The control system 150 may include a sensor array interface 166 that interfaces with a plurality of sensors, for example a global positioning system sensor, proximity sensor, image sensor, to obtain sensor data. The sensor array interface 166 may interface with any type of sensor suitable for operations as described herein.

The control system 150 may include the imaging controller 160 to generate light reflection profiles, enhance images and detect objects as described herein. The imaging controller 160 may adjust the images and detect objects based on data from the imaging device interface 152 and sensor array interface 166.

Additionally, the imaging controller 160 may include a processor 160a (e.g., embedded controller, central processing unit/CPU) and a memory 160b (e.g., non-volatile memory/NVM and/or volatile memory) containing a set of instructions, which when executed by the processor 160a, cause the imaging controller 160 to generate light reflection profiles, enhance images and detect objects as described herein.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:
1. A vehicle comprising:
one or more cameras to capture one or more images including a first image; and
an image controller that includes logic to:
identify one or more light sources;
generate a light reflection profile associated with the one or more light sources, wherein the light reflection profile is to predict one or more of reflection characteristics of light emitted from the one or more light sources or identify at least one characteristic of the one or more light sources;
one or more of adjust the first image based on the light reflection profile or identify one or more characteristics of a first object in the first image based on the light reflection profile;

determine first light reflected from a first side of the first object;
determine second light reflected from a second side of the first object;
conduct a comparison of the first light reflected from the first side of the first object to the second light reflected from the second side of the first object; and
identify one or more characteristics of the first object based on the comparison,
wherein the first side of the first object is different from the second side of the first object.

2. The vehicle of claim 1, wherein the logic is to:
generate the light reflection profile based on an identified position of a first light source of the one or more light sources;
determine reflected light reflected from the first object based on the first image; and
identify the one or more characteristics of the first object based on the determined reflected light and the light reflection profile.

3. The vehicle of claim 2, wherein the one or more characteristics include a size of the first object, a height of the first object, a distance of the first object from the vehicle, a position of the first object relative to the vehicle and a direction of the first object relative to the vehicle.

4. The vehicle of claim 1, wherein the logic is to:
identify one or more characteristics of a second object, wherein the one or more characteristics of the second object are to include at least a material of the second object;
generate the light reflection profile based on the one or more characteristics of the second object; and
adjust the first image based on the one or more characteristics of the second object in the light reflection profile.

5. The vehicle of claim 1, wherein the logic is to:
identify an external light source based on the first image and the light reflection profile, wherein the external light source is absent in the first image.

6. The vehicle of claim 5, wherein the logic is to:
identify one or more changes in characteristics of the light reflection profile;
determine a distance and a movement of the external light source based on the one or more changes; and
determine if another object has moved between the external light source and a reflectance area.

7. The vehicle of claim 1, wherein the logic is to:
generate an astral body reflection profile; and
one or more of adjust the first image based on the astral body reflection profile or identify the one or more characteristics of the first object in the first image based on the astral body reflection profile.

8. The vehicle of claim 1, wherein the logic is to:
identify weather related data; and
one or more of adjust the first image based on the weather related data or identify the one or more characteristics of the first object in the first image based on the weather related data.

9. At least one computer readable storage medium comprising a set of instructions, which when executed by an image controller of a vehicle, cause the image controller to:
identify one or more light sources;
generate a light reflection profile associated with the one or more light sources, wherein the light reflection profile is to predict one or more of reflection characteristics of light emitted from the one or more light sources or identify at least one characteristic of the one or more light sources;
one or more of adjust a first image based on the light reflection profile or identify one or more characteristics of a first object in the first image based on the light reflection profile;
determine first light reflected from a first side of the first object;
determine second light reflected from a second side of the first object;
conduct a comparison of the first light reflected from the first side of the first object to the second light reflected from the second side of the first object; and
identify the one or more characteristics of the first object based on the comparison,
wherein the first side of the first object is different from the second side of the first object.

10. The at least one computer readable storage medium of claim 9, wherein the instructions, when executed, cause the image controller to:
generate the light reflection profile based on an identified position of a first light source of the one or more light sources;
determine reflected light reflected from the first object based on the first image; and
identify the one or more characteristics of the first object based on the determined reflected light and the light reflection profile.

11. The at least one computer readable storage medium of claim 10, wherein the one or more characteristics include a size of the first object, a height of the first object, a distance of the first object from the vehicle, a position of the first object relative to the vehicle and a direction of the first object relative to the vehicle.

12. The at least one computer readable storage medium of claim 9, wherein the instructions, when executed, cause the image controller to:
identify one or more characteristics of a second object, wherein the one or more characteristics of the second object are to include at least a material of the second object;
generate the light reflection profile based on the one or more characteristics of the second object; and
adjust the first image based on the one or more characteristics of the second object in the light reflection profile.

13. The at least one computer readable storage medium of claim 9, wherein the instructions, when executed, cause the image controller to:
identify an external light source based on the first image and the light reflection profile, wherein the external light source is absent in the first image.

14. The at least one computer readable storage medium of claim 13, wherein the instructions, when executed, cause the image controller to:
identify one or more changes in characteristics of the light reflection profile;
determine a distance and a movement of the external light source based on the changes; and
determine if another object has moved between the external light source and a reflectance area.

15. The at least one computer readable storage medium of claim 9, wherein the instructions, when executed, cause the image controller to:
generate an astral body reflection profile; and one or more of adjust the first image based on the astral body reflection profile or identify the one or more characteristics of the first object in the first image based on the astral body reflection profile.

16. The at least one computer readable storage medium of claim 9, wherein the instructions, when executed, cause the image controller to:

identify weather related data; and one or more of adjust the first image based on the weather related data or identify the one or more characteristics of the first object in the first image based on the weather related data.

17. A method of image analysis with an image controller of a vehicle, the method comprising:

identifying one or more light sources;

generating a light reflection profile associated with the one or more light sources, wherein the light reflection profile is to predict one or more of reflection characteristics of light emitted from the one or more light sources or identify at least one characteristic of the one or more light sources;

one or more of adjusting a first image based on the light reflection profile or identifying one or more characteristics of a first object in the first image based on the light reflection profile;

determining a first light reflected from a first side of the first object;

determining a second light reflected from a second side of the first object;

conducting a comparison of the first light reflected from the first side to the second light reflected from the second side of the first object; and identify the one or more characteristics of the first object based on the comparison, wherein the first side of the first object is different from the second side of the first object.

18. The method of claim 17, further comprising:

generating the light reflection profile based on an identified position of a first light source of the one or more light sources;

determining reflected light reflected from the first object based on the first image; and identifying the one or more characteristics of the first object based on the determined reflected light and the light reflection profile.

* * * * *